United States Patent [19]

Millick, 3rd et al.

[11] 4,284,760
[45] Aug. 18, 1981

[54] PROCESS FOR THE MANUFACTURE OF UNSATURATED POLYESTER RESINS

[75] Inventors: William H. Millick, 3rd, Wilmington, N.C.; Norman R. Newburg, Wilmington, Del.

[73] Assignee: Hercofina, Wilmington, N.C.

[21] Appl. No.: 129,939

[22] Filed: Mar. 13, 1980

[51] Int. Cl.³ .............................................. C08G 63/52
[52] U.S. Cl. .................................. 528/306; 525/445; 528/272
[58] Field of Search ............... 528/272, 303, 309, 306; 525/445

[56] References Cited

U.S. PATENT DOCUMENTS

| | | | |
|---|---|---|---|
| 3,647,759 | 3/1972 | Walker | 528/296 |
| 3,655,820 | 4/1972 | Kaupp | 528/309 X |

Primary Examiner—Lucille M. Phynes
Attorney, Agent, or Firm—Hazel L. Deming

[57] ABSTRACT

Disclosed is a process for producing styrene-soluble unsaturated polyester resins from DMT process residue. In a preferred embodiment of the process, DMT process residue is transesterified with propylene glycol until a hydroxyl-terminated ester product having a methoxyl content within a specified range is formed and then the resulting ester product is esterified with maleic anhydride.

5 Claims, 1 Drawing Figure

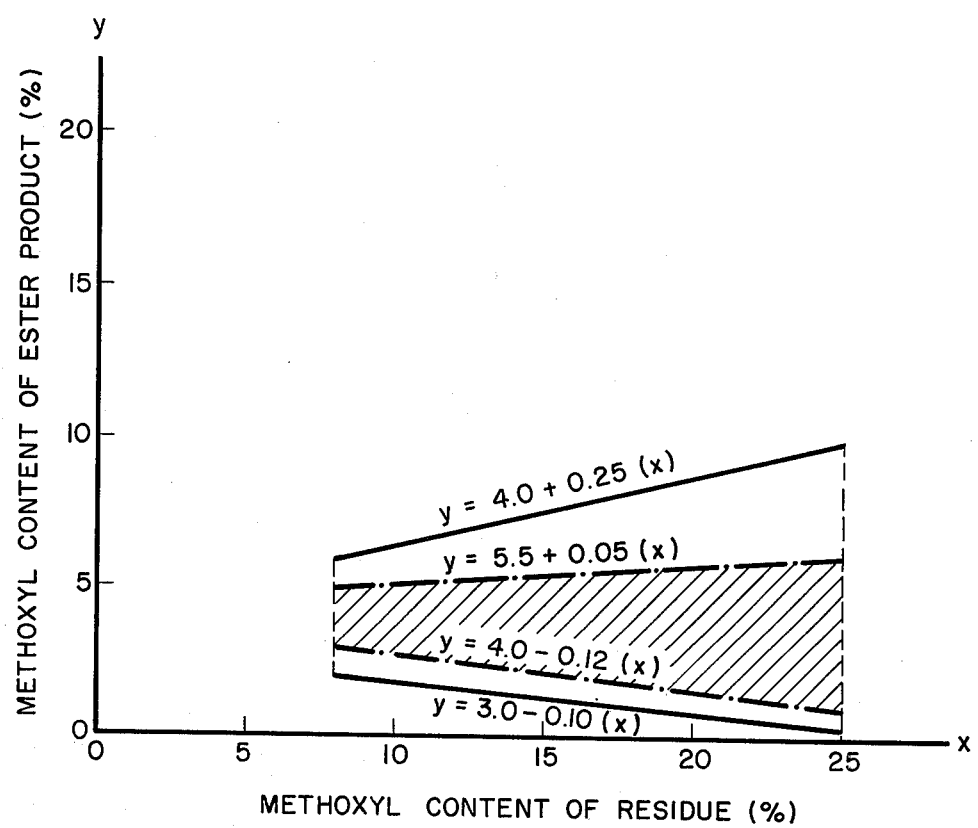

PROCESS FOR THE MANUFACTURE OF UNSATURATED POLYESTER RESINS

This invention relates to a process for producing styrene-soluble unsaturated polyester resins from the residues from the commercial process for producing dimethyl terephthalate (DMT) from p-xylene by oxidation, esterification and distillation of the DMT from the reaction mixture, and to the resulting products.

Dimethyl terephthalate (DMT) is produced commercially by a continuous process in which p-xylene is air oxidized to p-toluic acid, the acid is esterified with methanol to methyl p-toluate which is air oxidized to the monomethyl ester of terephthalic acid, and the monomethyl ester is further esterified with methanol to form DMT. In one commercial process the air oxidations are carried out together in one stage, the esterifications are performed together in another stage, and the esterification product is distilled to give a distillate comprising DMT and methyl p-toluate, and an esterified-oxidate residue. The DMT and methyl p-toluate are separated, the DMT is recovered and methyl p-toluate is returned to the oxidation stage. The esterified-oxidate residue which remains can be directly purged from the process, or a portion of the residue can be recycled to the oxidation stage and the remainder diverted from the process or, if desired, the residue can be processed further, as for example by distillation, heat treatment and/or methanolysis to recover useful constituents which might otherwise be lost, prior to purging the residue from the system. The residue which is finally purged from the process, either with or without additional processing, is called herein DMT process residue.

DMT process residue is a tar-like or solid material composed of a highly complex mixture of high molecular weight monomeric and polymeric constituents, included among which are the methyl and benzyl esters of biphenyl and triphenyl dicarboxylic and tricarboxylic acids. In the past, DMT process residue has been disposed of largely by incineration or the like because it appeared to have only limited commercial utility. However, at present day rates of production of DMT the quantities of residue produced are substantial and economically significant, and efforts have been directed to processes for converting the residue to a commercially useful product.

One such process is described by Kaupp in U.S. Pat. No. 3,655,820 and concerns forming polyester resins from the distillate obtained by heating DMT process residue at 270° C. under a vacuum of about 3.5 mm. In Kaupp's process a distillate composed largely of relatively high molecular weight aromatic polycarboxylic acid esters is transesterified with a polyhydric alcohol to form a hydroxyl-terminated ester product which is then esterified with maleic acid or its anhydride. The resulting unsaturated polyester is said to be soluble in styrene and to form therewith cured polyesters which have physical properties that are in some respects superior to resins prepared from pure aromatic polycarboxylic acids or their anhydrides. Styrene soluble unsaturated polyester resins, however, are not obtained under the conditions taught by the Kaupp patent where the starting material is the esterified-oxidate residue as it is purged from the DMT process or the residue which remains following distillation and/or further processing of esterified-oxidate residue. Hence the need still exists for means to form useful products from the residues of the DMT process and the search continues for economically attractive methods for treating DMT process residue.

Now in accordance with this invention, it has been found that styrene-soluble unsaturated polyester resins can also be obtained from the residues of the DMT process and that it is not necessary to separate and remove the higher boiling fractions therefrom and use only the distillate portion to form useful unsaturated resins, as taught by Kaupp's U.S. Pat. No. 3,655,820.

Accordingly, the present invention relates to a process for producing styrene-soluble unsaturated polyester resins from DMT process residue having a methoxyl content within the range of 8 to 25%, which process comprises forming from said residue a hydroxyl-terminated ester product having a methoxyl content which is inversely related to the methoxyl content of said residue and is within the range defined by equations $$Y = 3.0 - 0.10X \text{ and } Y = 4.0 + 0.25X$$

where Y is the methoxyl content of said ester product and X is the methoxyl content of said residue and is within the range of 8 to 25 by (a) transesterifying said residue with an excess of at least one dihydric alcohol until the methoxyl content is within the above defined range, or (b) transesterifying said residue with an excess of at least one dihydric alcohol until the methoxyl content is below the value defined by the equation $Y + 3.0 - 0.10X$ and adding thereto a sufficient quantity of said residue to adjust the methoxyl content of the product to a value within the above defined range, and reacting said ester product with an unsaturated dicarboxylic acid or its anhydride to form said unsaturated polyester resin.

The FIGURE of the accompanying drawing is a graph which shows the relationship of the methoxyl content of the hydroxyl-terminated ester product to the methoxyl content of the DMT process residue.

The DMT process residue used in the process of this invention as stated above, is esterified-oxidate residue directly purged from the DMT process or the residue which remains following further processing of esterified-oxidate to remove useful constituents which might otherwise be lost. These residues have the following typical range of properties:

| | |
|---|---|
| Color | Dark brown |
| Drop Softening Point | 10–140° C. |
| Acid Number (ASTM D-1639, neutral chloroform solvent) | 10–110 |
| Methoxyl in COOCH$_3$ (ASTM D-1166-60) | 8–25% by weight |
| DMT | 0–20% by weight |
| Saponification Number [Anal. Chem. 23, 1126 (1951)] | 375–500 |

The drop softening point data in this specification are obtained by the Hercules' Drop Softening Point Method described on page 12 of the booklet titled: "Wood Rosins, Modified Rosins and Related Resins", published in 1963 by Hercules Powder Company, now by change of name Hercules Incorporated.

The first step of the process of this invention is carried out by reacting DMT process residue having a methoxyl content within the range of 8 to 25% and preferably from 10 to 20% with a sufficient amount of a dihydric alcohol or a mixture of dihydric alcohols to provide an excess of hydroxyl groups over methoxyl groups under conditions to effect transesterification of the residue and to produce a hydroxyl-terminated ester product having a specified methoxyl content. The methoxyl content of the hydroxyl-terminated ester product produced from DMT process residue has been found to have an important bearing on whether or not the unsaturated resins produced therefrom by reaction with an unsaturated acid or its anhydride are soluble or insoluble in styrene. In fact, it has been found that unless a specific relationship is maintained between the methoxyl content of the hydroxyl-terminated ester product and that of the starting residue and more specifically that the methoxyl content of the ester product (Y) is controlled within a range defined by the equation $Y=3.0-0.10X$ and by the equation $Y=4.0+0.25X$, where X is the methoxyl content of the starting residue and is within the range of 8 to 25, the advantages of this invention will not be realized. It is, of course, understood that within the above defined range certain variation exists, depending upon such factors as the particular alcohol and the amount used and for each variation there will be an optimum. In the preferred embodiment of this invention the methoxyl content of the ester product will be within a range defined by the equation $Y=4.0-0.12X$ and by the equation $Y=5.5+0.05X$, where X and Y are as defined above.

The preferred dihydric alcohol reactants have from 3 to 12 carbon atoms and are typically diethylene glycol, the propylene glycols and particularly 1,2-propanediol, dipropylene glycol, neopentyl glycol, triethylene glycol, hexanediol, decanediol and dimethylolcyclohexane. Mixtures of the above glycols with each other and/or lower or higher glycols and triols and particularly mixtures of propylene glycol with up to about 75% by weight of the mixture of ethylene glycol or mixtures of propylene glycol with up to about 20% of a triol such as trimethylolpropane, and the like are also useful.

The reaction is conventional and is conveniently carried out by mixing the residue with the dihydric alcohol or mixture of dihydric alcohols in excess of the quantity necessary for the desired degree of transesterification, and maintaining the resulting mixture at an elevated temperature range for a period of time sufficient to effect the desired reaction. The DMT process residue may in some cases contain catalyst which was used to promote the oxidation and esterification reaction in the DMT process. To the extent that such catalysts are effective for transesterification, their presence will promote the present reaction. However, if such a catalyst has been removed or the amount thereof is not sufficient to act as a transesterification catalyst, a sufficient quantity of a conventional transesterification catalyst such as zinc, calcium or magnesium acetate, tin salts or esters, titanium esters and the like is preferably added to the mixture to provide a catalytic quantity of transesterification catalyst. The reaction is generally carried out at a temperature within the range of about 140° to about 240° C. and preferably from about 160° to about 230° C. at atmospheric pressure. Subatmospheric or superatmospheric pressures can be used, if desired. The reaction time will vary, depending upon the temperature and degree of transesterification desired and usually will range from about 2 hours to about 48 hours. Of course, the higher the temperature, the shorter the time required for substantially complete reaction. The reaction can be conveniently monitored by measuring the amount of methanol released.

As stated, the transesterification reaction is carried out in one of two ways, i.e., until a specified portion of the methyl esters present in the DMT process residue, as measured by methoxyl content, have been transesterified and the methoxyl content of the ester product is within the range defined by the equations $Y=3.0-0.10X$ and $Y=4.0+0.25X$ (where Y and X are as defined above), or alternatively until a substantial portion of the methyl esters present in the DMT process residue have been transesterified and the methoxyl content of the ester product is below the value defined by the equation $Y=3.0-0.10X$, in which case a sufficient quantity of DMT process residue is added to the ester product to adjust the methoxyl content to within the above defined range.

The relationship of the methoxyl content of the hydroxyl-terminated ester product to that of the DMT process residue is further illustrated by reference to the accompanying drawing. The drawing is a graph wherein the methoxyl content of the residue (within the limits of 8 to 25) is shown along the X-axis and the methoxyl content of the ester product is shown along the Y-axis. Thus the line labeled $Y=3.0-0.10X$ provides a means for directly determining the minimum value of Y for specific values of X and the line labeled $Y=4.0+0.25X$ provides similar means for determining the maximum value of Y for specific values of X. Further, by means of connecting lines,    , at 8 and 25 on the X-axis, a quadrilateral area is defined which delineates the scope over which this invention is practiced. The preferred range for the methoxyl content of the ester product is also shown on this graft by means of interrupted lines,    , labeled $Y=4.0-0.12X$ and $Y=5.5+0.05X$ and the quadrilateral area which is defined thereby is represented by shading.

Following transesterification unreacted dihydric alcohol can be removed from the reaction mixture, if desired, as by distillation which leaves the desired reaction product as the residue. Usually, and particularly when an unsaturated polyester having a medium to high unsaturated acid content is desired, there is no need to remove unreacted alcohol, since additional dihydric alcohol will be required in the subsequent esterification reaction.

The hydroxyl-terminated ester products produced from DMT process residue and which have a methoxyl content within the above defined range form styrene-soluble unsaturated polyester resins with unsaturated dicarboxylic acids or their anhydrides by an esterification reaction. The preferred unsaturated acid reactants are typically fumaric acid, maleic acid, maleic anhydride, citraconic acid and mesaconic acid. The reaction is conventional and usually carried out at temperatures of 160° to 250° C., and preferably at 180° to 230° C., for 4 to 24 hours using an excess of hydroxyl functionality. The reaction can be conveniently monitored by measuring the acid number or acid number and viscosity. The product which is obtained is the desired product.

The unsaturated polyesters obtained by the process of this invention are typically viscous fluids or solids at 25° C., are soluble in styrene and other unsaturated monomers such as vinyl toluene, diallyl phthalate and acrylic and methacrylic esters and have viscosities of 100 to 18,000 cps., and preferably 200 to 10,000 cps., as determined at a 60% concentration in styrene at 25° C. The solutions of the resin are stable, are readily cured with conventional peroxide catalysts and are useful in fiber reinforced composites, sheet and bulk molding compositions, corrosion resistant plastics for construction, marine and transportation uses, etc.

The best mode now contemplated for carrying out this invention is illustrated by the following examples of specific embodiments thereof, and the invention is not limited to these specific embodiments. In these examples, all percentages are by weight unless indicated otherwise.

EXAMPLE 1

A mixture of 900 grams of DMT process residue, 1350 grams of 1,2-propanediol and 0.45 gram of zinc acetate dihydrate was charged to a reaction vessel fitted with an agitator, a packed column to separate distillate from the reactants and a condenser system. The DMT process residue used in this example was esterified-oxidate residue having an acid number of 29, a saponification number of 462 and a methoxyl content of 15.4%. The charge was heated gradually to 185° C. over a 15 hour period while controlling the overhead temperature at below 90° C. to insure that the distillate was principally methanol. Next, the charge was cooled to room temperature to terminate the reaction and the reaction system was placed under a vacuum of 4 mm. and heated rapidly to 120° C. to distill unreacted 1,2-propanediol from the reaction mixture. The resulting hydroxyl-terminated ester product had a hydroxyl content of 8.2% and a methoxyl content of 3.6%.

A 250 gram portion of the hydroxyl-terminated ester produced above was transferred to a reaction vessel equipped with heating means, thermometer, agitator, nitrogen sparge and water collector and heated to 160° C. with agitation, following which time 53 grams of maleic anhydride were added to the vessel. The reaction mixture was slowly heated to 215° C. over a three hour period and the mixture was maintained at 215° C. for an additional 4 hours. The product at 215° C. was a dark brown viscous liquid which, upon cooling, gave a brittle resin. The resin was completely soluble in styrene, had an acid number of 9.4 and a bromine number of 29.5 and 75% of the unsaturation was in the fumarate configuration.

A 60% solution of the resin in styrene (having a viscosity of 320 cps. at 25° C.) was mixed with 1% of benzoyl peroxide based on the weight of the resin solution, the mixture was poured into a mold (½×¼×15″) and was cured for 2 hours at 70° C. and then for 2 hours at 121° C. The cured bar had a Barcol hardness of 35, a heat distortion temperature of 79° C. and an impact strength (notched Izod) of 0.30 ft. lbs.

EXAMPLE 2

The reaction vessel described in Example 1 was charged with 755 grams of DMT process residue (saponification number of 467, acid number of 54 and methoxyl content of 16.7%), 1132 grams of 1,2-propanediol and 0.75 gram of zinc acetate dihydrate and the charge was heated gradually to 185° C. over a period of 7 hours while collecting the methanol distillate. The resulting mixture was cooled to room temperature, and the system was placed under a vacuum of 4 mm. and heated rapidly to 125° C. to remove unreacted 1,2-propanediol from the mixture. The product was a dark viscous hydroxyl-terminated ester having a hydroxyl content of 9.0% and a methoxyl content of 2.3%.

To a 250 gram portion of the ester product produced above at 160° C. was added 58.5 grams of maleic anhydride and the resulting mixture was heated to 205° C. over a 3 hour period and maintained at 205° C. for 4 additional hours. The product at 205° C. was a dark viscous resin and upon cooling to room temperature gave a brittle solid. The resin was completely soluble in styrene and had a viscosity at 60% concentration in styrene of 1070 cps. at 25° C. Analyses gave an acid number of 10 and a bromine number of 29.7 and showed that 69% of the unsaturation was in the fumarate configuration. Cured bars produced from a 60% solution of the resin in styrene in accordance with the procedure of Example 1 gave a Barcol hardness of 35 and a heat distortion temperature of 90° C.

EXAMPLE 3

The procedure of Example 1, paragraph 1 was repeated except that the DMT process residue had a saponification number of 459, an acid number of 65 and a methoxyl content of 17.4%, 450 grams of 1,2-propanediol were used, the charge was heated to 215° C. over 14 hours, and the distillation step was omitted. The resulting hydroxyl-terminated ester product had a methoxyl content of 2.4% and a hydroxyl content of 8.5%.

A mixture of 250 grams of the ester product and 110 grams of 1,2-propanediol was heated to 130° C., 183 grams of maleic anhydride were added and the resulting mixture was heated gradually to 210° C. over a 3.5 hour period and maintained at 210° C. for an additional 4 hours. The final product was completely soluble in styrene and at a 60% concentration in styrene had a viscosity of 884 cps. at 25° C. Analyses on the product gave an acid number of 18 and a bromine number of 52.7 and showed that 97% of the unsaturation was in the fumarate configuration. Cured bars produced from a 60% styrene solution of the resin in accordance with the procedure of Example 1 had a heat distortion temperature of 135° C.

EXAMPLE 4

A mixture of 250 grams of the hydroxyl-terminated ester product prepared in paragraph 1 of Example 3 and 31.8 grams of 1,2-propanediol were heated to 160° C., 92 grams of maleic anhydride were added and the resulting mixture was heated gradually to 210° C. over a 3 hour period and maintained at 210° C. for an additional 4 hours. The resinous product was completely soluble in styrene and at a 60% concentration in styrene had a viscosity of 627 cps. at 25° C. Analyses gave an acid number of 11 and a bromine number of 38.7 and showed that 92% of the unsaturation was in the fumarate configuration. Cured bars produced from a 60% solution of the resin in styrene in accordance with the procedure of Example 1 had a Barcol hardness of 37 and a heat distortion temperature of 109° C.

EXAMPLE 5

To a 250 gram portion of the hydroxyl-terminated ester product prepared in paragraph 1 of Example 3, at 160° C. were added 55.1 grams of maleic anhydride and the mixture was heated gradually to 210° C. over a 3 hour period and maintained at 210° C. for an additional 4 hours. The resinous product was completely soluble in styrene, had a viscosity at 60% concentration in styrene of 1760 cps. at 25° C., an acid value of 14.6 and a bromine number of 29.2 and showed that 88% of the unsaturation was in the fumarate configuration.

EXAMPLE 6

The reaction vessel described in Example 1 was charged with 1575 grams of DMT process residue (saponification number of 531, acid number of 36 and methoxyl content of 18.4%), 984 grams of 1,2-propanediol and 0.79 gram of zinc acetate dihydrate. The charge was heated gradually to 220° C. over a 24 hour period, at which time methanol evolution had ceased and a dark viscous liquid hydroxyl-terminated ester was obtained. Analyses on the product gave an hydroxyl content of 11%, an acid number of 2 and a methoxyl content of 0.42%.

A mixture of 300 grams of the hydroxyl-terminated ester product produced above, 39.2 grams of the starting DMT process residue and 41.2 grams of 1,2-propanediol was heated to 160° C., 126.4 grams of maleic anhydride were added and the resulting mixture was heated gradually to 210° C. over a 3 hour period and then maintained at 210° C. for an additional 5 hour period. At the end of the reaction period the product was easily stirred and was completely soluble in styrene. The product had a viscosity at 60% concentration in styrene of 1290 cps. at 25° C. Analyses on the product gave an acid number of 23 and a bromine number of 40.1 and showed that 94% of the unsaturation was in the fumarate configuration. Cured bars produced from a 60% solution of the resin in accordance with the procedure of Example 1 gave a Barcol hardness of 38 and a heat distortion temperature of 112° C.

EXAMPLE 7

A mixture of 300 grams of the hydroxyl-terminated ester product produced in paragraph 1 of Example 6, 61.3 grams of the DMT process residue used in Example 3 and 50.1 grams of 1,2-propanediol was heated to 160° C. 135.6 grams of maleic anhydride were added and the resulting mixture was heated gradually to 210° C. over a 3 hour period and maintained at 210° C. for 5 additional hours. The product was completely soluble in styrene and had a viscosity at 60% concentration in styrene of 1760 cps. at 25° C. Analyses on the product gave an acid number of 24 and a bromine number of 39.3 and showed that 89% of the unsaturation was in the fumarate configuration.

EXAMPLE 8

A mixture of 1575 grams of DMT process residue (saponification number of 470, acid number of 38, and methoxyl content of 19.8%), 248 grams of ethylene glycol, 646 grams of 1,2-propanediol and 0.79 grams of zinc acetate dihydrate was charged to the reaction vessel described in Example 1. During a period of 19 hours the charge was gradually heated to 215° C. while removing the methanol distillate. The reaction mixture was then cooled to room temperature and a dark viscous liquid was obtained. Analyses on the product gave a hydroxyl content of 12.5%, an acid number of 2.5 and a methoxyl content of 2.1%.

To a 300 gram portion of the above formed hydroxyl-terminated ester product at 160° C. was added 98 grams maleic anhydride. The mixture was gradually heated to 210° C. during 3 hours and maintained at 210° C. for an additional 5 hours. The resinous product was completely soluble in styrene, gave a viscosity at 60% concentration in styrene of 1150 cps. at 25° C., had an acid number of 17.2 and a bromine number of 37.1, and showed that 92% of the unsaturated was in the fumarate configuration.

COMPARATIVE EXAMPLE A

When the general procedure of Example 7 was repeated except that a mixture of 300 grams of the hydroxyl-terminated ester product produced in paragraph 1 of Example 6 and 24.2 grams of 1,2-propanediol (no added DMT residue) was heated to 160° C., 107.5 grams of maleic anhydride were added and the resulting mixture was heated gradually to 210° C. over a 3 hour period and the mixture was maintained at 210° C. for 4 additional hours, the product gelled, could not be stirred and was insoluble in styrene.

What I claim and desire to protect by Letters Patent is:

1. A process for producing styrene-soluble unsaturated polyester resins from DMT process residue having a methoxyl content within the range of 8 to 25%, which process comprises forming from said residue a hydroxyl-terminated ester product having a methoxyl content which is inversely related to the methoxyl content of said residue and is within the range defined by equations $$Y=3.0-0.10X \text{ and } Y=4.0+0.25X$$

where Y is the methoxyl content of said ester product and X is the methoxyl content of said residue and is within the range of 8 to 25 by
   (a) transesterifying said residue with an excess of at least one dihydric alcohol until the methoxyl content is within the above defined range, or
   (b) transesterifying said residue with an excess of at least one dihydric alcohol until the methoxyl content is below the value defined by the equation $Y=3.0-0.10X$ and adding thereto a sufficient quantity of said residue to adjust the methoxyl content of the product to a value within the above defined range, and
reacting said ester product with an unsaturated dicarboxylic acid or its anhydride to form said unsaturated polyester resin.

2. The process of claim 1 in which the dihydric alcohol is 1,2-propanediol.

3. The process of claim 2 in which the DMT process residue has a methoxyl content of 10 to 20%.

4. The process of claim 3 in which the unsaturated dicarboxylic acid or anhydride is maleic acid or maleic anhydride.

5. The product produced by the process of claim 1.

* * * * *